US005465757A

United States Patent [19]

Peters

[11] Patent Number: 5,465,757

[45] Date of Patent: Nov. 14, 1995

[54] ELECTRO-HYDRAULIC FLUID METERING AND CONTROL DEVICE

[75] Inventor: Norman K. Peters, South Bend, Ind.

[73] Assignee: AlliedSignal Inc., Morristown, N.J.

[21] Appl. No.: 134,770

[22] Filed: Oct. 12, 1993

[51] Int. Cl.[6] .......................... F15B 13/044; G05B 11/60

[52] U.S. Cl. ................ 137/625.65; 137/82; 251/129.04; 318/653

[58] Field of Search ................................ 137/82, 625.62, 137/625.65; 251/129.04; 318/653, 660

[56] References Cited

U.S. PATENT DOCUMENTS

| | | | |
|---|---|---|---|
| 2,775,254 | 12/1956 | Stanbury | 137/82 |
| 3,777,784 | 12/1973 | Nicholson | 137/625.62 |
| 4,251,762 | 2/1981 | Williams | 137/596.17 X |
| 5,070,898 | 12/1991 | Jagodzinski et al. | 137/82 |
| 5,285,715 | 2/1994 | Elrod et al. | 137/625.64 X |

FOREIGN PATENT DOCUMENTS

| | | | |
|---|---|---|---|
| 2104249 | 3/1983 | United Kingdom | 137/625.65 |

*Primary Examiner*—Gerald A. Michalsky
*Attorney, Agent, or Firm*—Leo H. McCormick, Jr.; Larry J. Palguta

[57] ABSTRACT

An electro-hydraulic fluid metering and control device with a position sensor having a plane of geometric symmetry. The control device includes a valve body with a plurality of ports and channels for fluid flow, a torque motor mounted on the valve body and responsive to an electrical driving signal, a valve, an armature operating in the torque motor and extending to operate the valve and position sensor and spring members for supporting the armature for pivotal movement to assure direct relationship between the valve and moving member of the position sensor.

6 Claims, 5 Drawing Sheets

FIG. 4
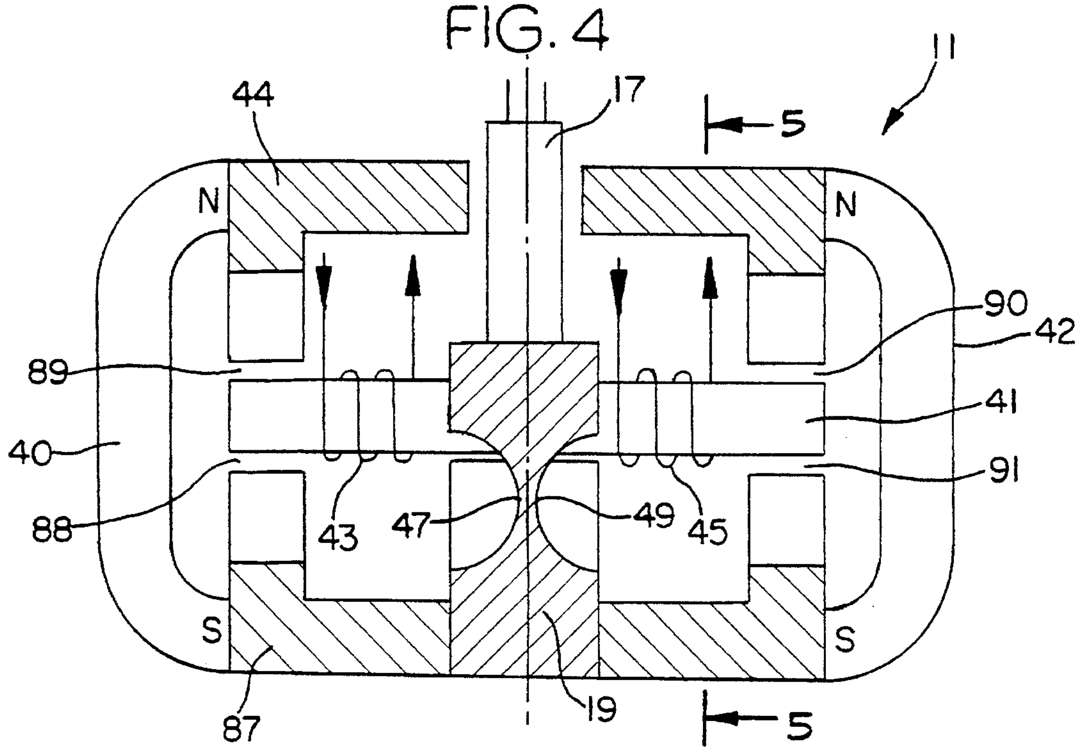
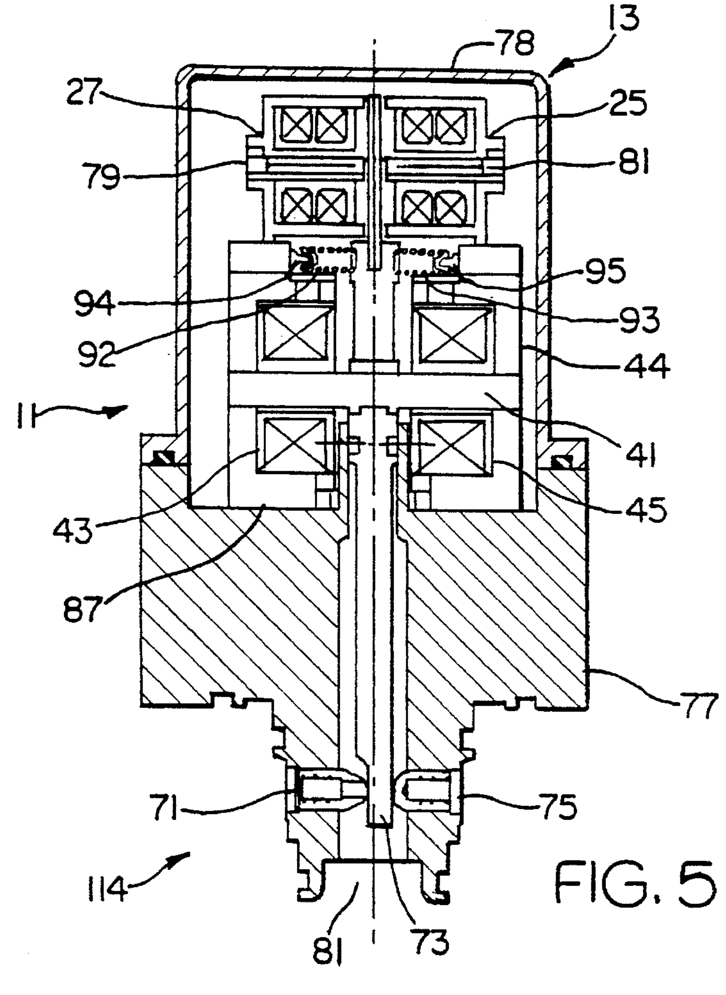
FIG. 5

ELECTRO-HYDRAULIC FLUID METERING AND CONTROL DEVICE

SUMMARY OF THE INVENTION

This invention relates to an electro-hydraulic fluid metering and control device for use in a control for a turbine engine. The electro-hydraulic fluid metering and control device includes: a valve body with ports to channel fluid; a torque motor mounted on the valve body and responsive to an electrical driving signal; a valve; a position sensor; an armature operating in the torque motor and extending to operate the valve and position sensor in direct relationship of positions; and a spring structure for supporting the armature for pivotal movement and assuring direct relationship between the valve and the position sensor.

This type of electro-hydraulic fluid metering and control devices are well suited to gas turbine engines used to power small business and commuter aircraft and auxiliary power units.

Prior art electro-hydraulic fluid metering and control devices of this type such as disclosed in U.S. Pat. No. 5,070,898, do not include a position sensor as in the present invention and typically exhibit one or more objectionable performance limitations, such as the following: magnetic hysteresis, mechanical hysteresis, pressure loading, static or dynamic temperature effects, slow transient recovery, dynamic instability or require pressurization for test.

Attempts to obtain the benefits of electrical feedback with such prior art position sensors such as linear variable differential transformers, variable reluctance position sensors, capacitive pickoffs and Hall effect devices, have encountered one or more objectional performance limitations such as the following: static and dynamic temperature errors, non-linearities, operating temperature limitations, hysteresis, repeatability and long-term stability.

In the present invention, the previously recited performance limitations are substantially reduced by a factor approximately equal to the feedback loop gain of the position sensor and associated electronic circuits and feedback loop gains greater than ten are readily achievable. Further, performance limitations of the prior art position sensors are substantially reduced by the geometric symmetry of position sensor cores and coils around the armature and by the signal processing which develops the ratio of the difference of the signals over the sum of the signals.

In general in the present invention, a torque motor responds to an electrical driving signal. Electronic circuitry associated with the an operational input device responds to a request signal to provide the torque motor with a driving signal. A position sensor provides output signals which indicate the position of the valve. A signal conditioning circuit excites the position sensor and processes the sensor signals into a linearized signal for comparison with the request signal. The compared signals are thereafter utilized to modify the torque motor driving signal.

The signal conditioning circuit operates by subtracting the two position sensor signals to form a difference signal or by adding the two position sensor signals to form a sum signal, and divide the difference signal by the sum signal to form a linearized position signal.

The torque motor may be a dual coil T-bar torque motor having an armature supported by spring structure for pivotal movement. The armature includes magnetic extensions which operate within the torque motor, a non-magnetic extension to operate the valve and a magnetic extension to operate the position sensor. The movement of the armature defines a plane of geometric symmetry and the axis of pivotal movement is perpendicular to the plane of geometric symmetry.

In addition, a fluid seal which is located on the axis of pivotal movement of the armature to minimize seal movement, isolates the torque motor from the metered and controlled fluid supplied to operate the control device.

Still further, the position sensor of the metering and control device includes a pair of like magnetic cores positioned symmetrically one to either side of the plane of geometric symmetry and a magnetic extension of the armature. There are a pair of excitation coils symmetrically positioned about the respective magnetic cores, and a pair of sensing coils symmetrically positioned about the respective magnetic cores. Typically, the pair of excitation coils are connected in series to assure a common current flow. The armature magnetic extension for the sensor is located between the magnetic cores. The armature magnetic extension for the sensor moves closer to one of the cores and further from the other core as the armature pivots in one direction and moves closer to the other core and further from the first core as the armature pivots in the opposite direction. Thus, during armature motion, the reluctance of the magnetic circuit on one side of the plane of geometric symmetry is increasing as the armature approaches while the reluctance of the other magnetic circuit is decreasing as the armature moves further away from it.

An advantages of the present invention occurs since the position sensor can accurately senses the position of a magnetic armature that typically has a total movement of less than 0.020 inch to provide an electrical signal proportional to the magnetic armature movement.

The various aspects of the present invention will be more fully understood when the following descriptions are read in conjunction with the accompanying drawings.

BRIEF DESCRIPTION OF THE DRAWINGS

FIG. 4 is an enlarged view of the torque motor of FIG. 1;

FIG. 5 is a view along section lines 5—5 of FIG. 4;

Corresponding reference characters indicate corresponding parts throughout the several drawing views.

DESCRIPTION OF THE PREFERRED EMBODIMENTS

Figure 1:
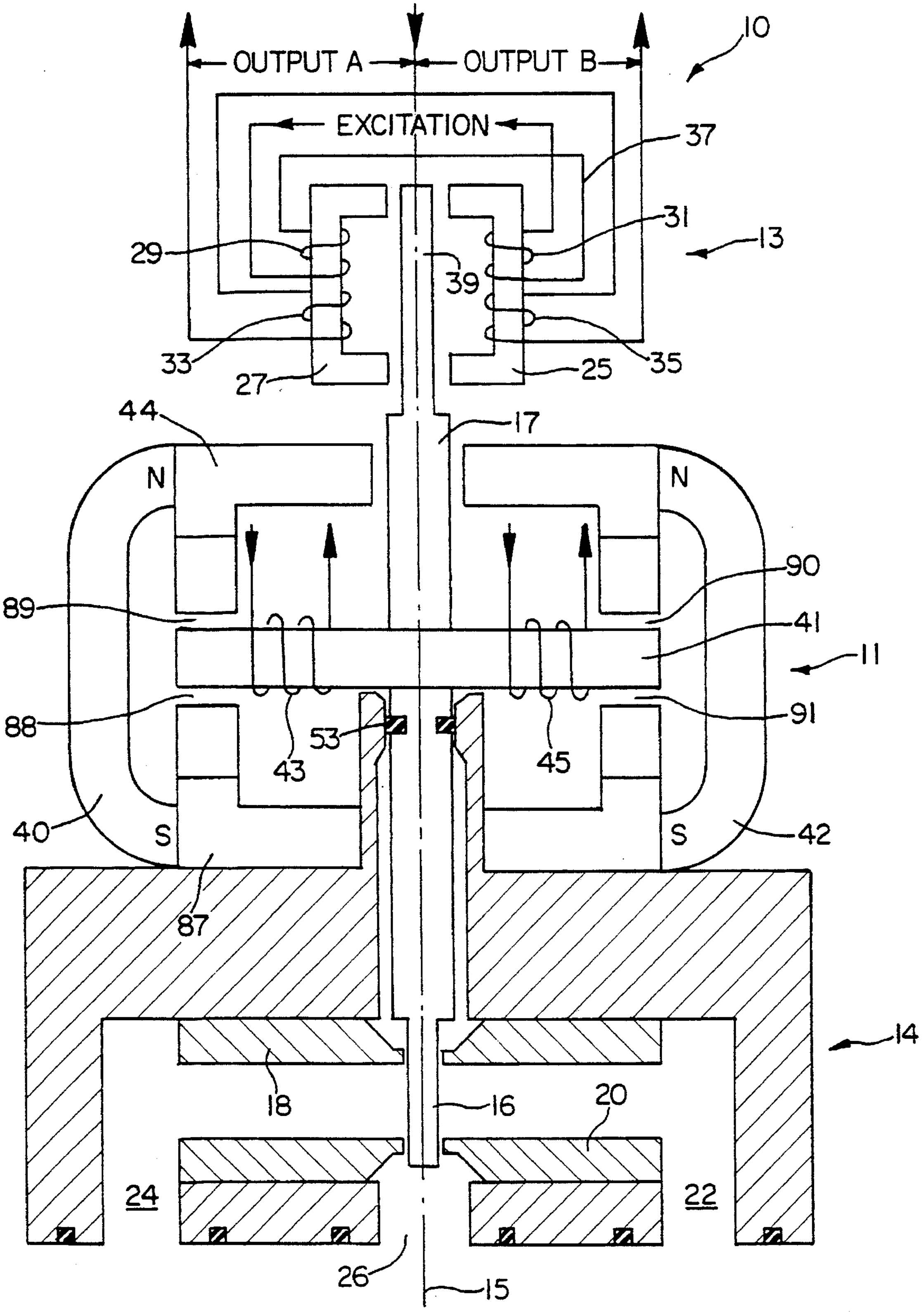
FIG. 1 is a schematic representation of an electro-hydraulic fluid metering and control device made according to the present invention.
Figure 6:
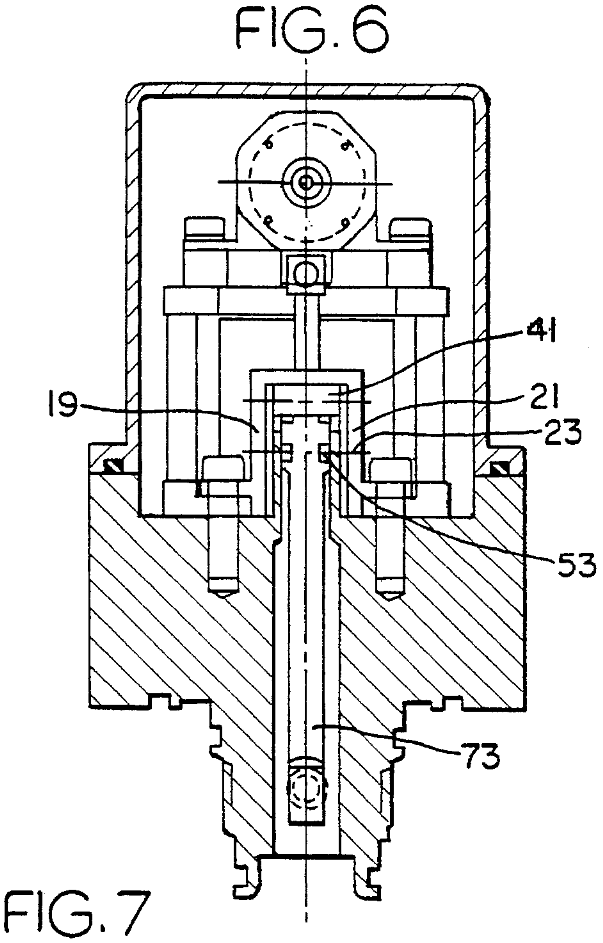
FIG. 6 is a cross-sectional view of an implementation of the electro-hydraulic fluid metering and control device of FIG. 1.

The electro-hydraulic fluid metering and control device 10 illustrated in FIG. 1 includes a torque motor portion 11 and a position sensor portion 13. The electro-hydraulic fluid metering and control device 10 has a plane of geometric symmetry lying along the center line 15 and extending perpendicularly from the plane of the drawing. An armature 17 which is supported by a spring structure made up by a pair of springs 19 and 21 (FIGS. 4 and 6) pivotally moves about an axis 23 (FIG. 6) which axis lies in the plane of geometric symmetry. The motor portion 11 is made of a dual coil T-bar torque motor and provides torque for pivoting the armature 17. The armature position sensor 13 includes a pair of identical magnetic cores 25 and 27 which are symmetrically positioned one to either side of the plane of geometric symmetry. Each of the cores 25 and 27 have an excitation coil 29 or 31 and a signal coil 33 or 35 which are symmetrically positioned about the respective magnetic cores. The excitation coils 29 and 31 are connected in series by connection 37 to assure a common current flow.

The armature 17 passes through a seal 53 and extends into a valve 14 to form a flapper 16 which is positioned between a pair of nozzles 18 and 20 for controlling the pressure and flow of a fluid through port 26. In this dual nozzle configuration, port 22 may be connected to the fluid supply pressure and port 24 connected to the fluid return pressure or port 24 may be connected to the fluid supply pressure and port 22 connected to the fluid return pressure. The flapper 16 of valve 14 extends along the plane of geometric symmetry and the torque motor 11 positions the flapper 16 relative to the nozzles in response to a driving signal. The position sensor 13 provides a signal indicative of the position of the flapper relative to the nozzles.

The armature 17 has a magnetic portion 39 that is located between the magnetic cores 25 and 27 of position sensor 13. Magnetic portion 39 moves closer to core 25 and further from core 27 as the armature pivots clockwise as viewed about axis 23. Portion 39, of course, moves closer to the other core 27 and further from the first core 25 as the armature pivots in the opposite or counterclockwise direction.

The torque motor 11 as shown in FIGS. 1, 4, 5 and 6 includes a torque motor armature portion 41 extending from armature 17 laterally and generally perpendicular to the plane of geometric symmetry 15. There are a pair of torque motor coils 43 and 45 positioned around the armature portion 41, one to either side of the plane of geometric symmetry. The torque motor stator includes a pair of permanent magnets 40 and 42 with pole pieces such as 44 and 87 providing flux to the gaps 88, 89, 90 and 91 near the free ends of the armature portion 41. The armature 17 is pivotably supported by a pair of springs 19 and 21. These springs have a narrowed spring sections at 47 and 49 and positioned so the pivot axis 23 passes not only through the narrowed spring sections, but also through an elastomeric seal 53. Torque motor 11 may be selectively and independently energized to cause armature 17 to pivot and provide an input to valve 14 through the movement of flapper 16.

Figure 3:
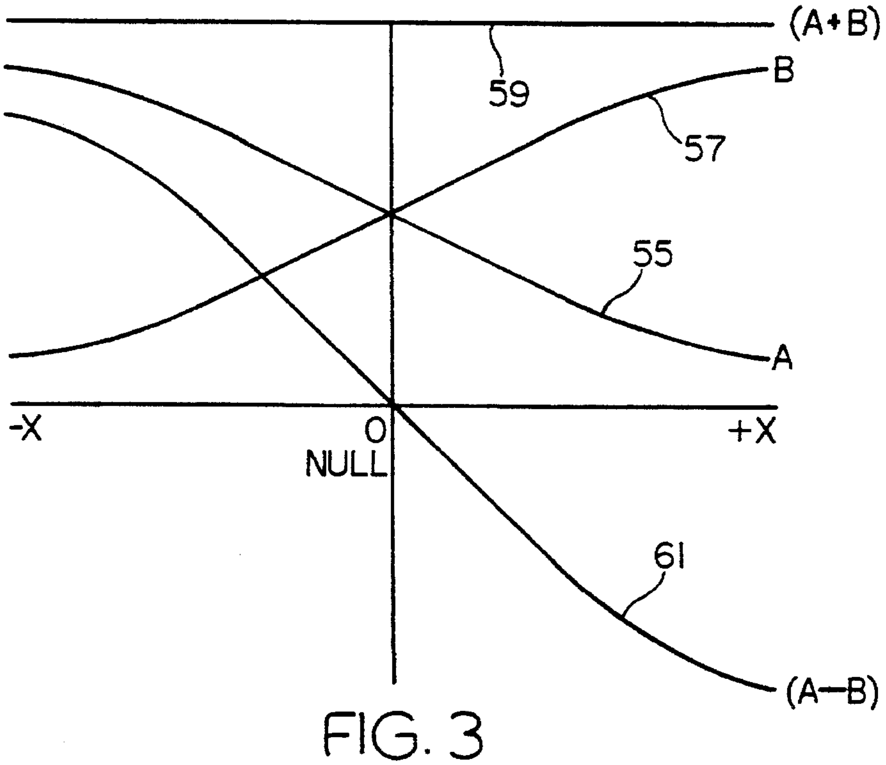
FIG. 3 is a graph illustrating the linearity achievable by appropriately combining the signals of the position sensor of FIG. 1.

With an alternating current excitation signal applied to the series connected excitation coils 29 and 31, each of the secondary coils 33 and 35 of FIG. 1 provides an output signal which is a function of the armature position and the excitation signal. The magnitude of the signal produced by coil 33 increases as the magnetic portion 39 moves toward core 27 while the magnitude of the signal produced by coil 35 decreases. The magnitude of the signal produced by coil 35 increases as the magnetic portion 39 moves toward core 25, and the magnitude of the signal produced by coil 33 decreases. These output signals are identified by curves 55 and 57 in FIG. 3. The sum of these two signals is substantially independent of the armature position as shown by curve 59 in FIG. 3 while the difference is illustrated by curve 61 is substantially linear over the range of separation (abscissa) values of interest and is zero when the magnetic portion 39 of armature 17 is midway between cores 25 and 27.

Figure 2:
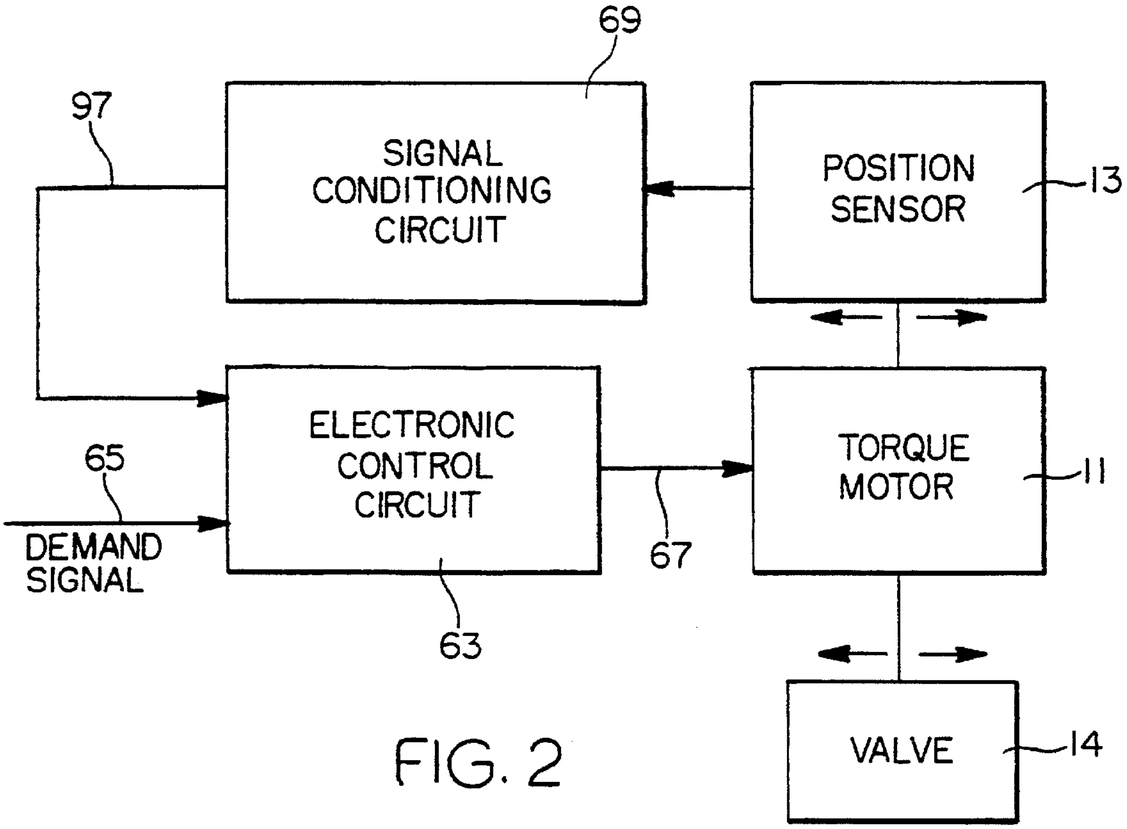
FIG. 2 is an electrical schematic diagram which includes the electronic control and signal conditioning circuitry for the electro-hydraulic fluid metering and control device of FIG. 1.

As seen in FIG. 2, electronic control circuitry 63 responds to the difference between a demand signal on line 65 and a linearized position signal from the signal conditioning circuit 69 to provide a driving signal on line 67 to the torque motor 11. The signal conditioning circuit 69 performs the arithmetic illustrated graphically in FIG. 3 by subtracting the two armature position indicative signals to form a difference signal, adding the same two signals to form a sum signal, dividing the difference signal by the sum signal to form a linearized position signal. This difference over sum signal processing in the signal conditioning circuit 69 substantially compensates for excitation signal and sensor temperature variations.

The electronic control circuitry 63 then utilizes this linearized feedback signal on line 97 to modify the torque motor driving signal on line 67. The electronic control circuit 63 assures maximum static and dynamic accuracy in the transfer function of valve flapper 16 position vs demand signal 65. The effects of various sources of inaccuracy such as torque motor hysteresis, mechanical hysteresis, static and dynamic temperature effects, G-loading, and fluid pressure loading of the flapper are reduced by the feedback loop gain. The metering and control areas formed by nozzles 18 and 20 and the flapper 16 are functions of the position of the magnetic portion 39 of the armature 17. The accuracy of these metering and control areas is assured by the characteristics of the feedback sensor 13.

The position of armature 17 position is determined by the net fluxes developed by the drive signals in coils 43 and 45. The armature support springs 19 and 21 provide positive spring rate. The magnetic flux developed by the permanent magnets 40 and 42 in the gaps 88, 89, 90 and 91 between the magnetic armature 41 and pole pieces 44 and 87 provides negative spring rate. To permit control the valve if the signal conditioning circuit 69 or sensor 13 should fail, the positive spring rate is designed to be substantially greater than the magnetic spring rate at all normal positions of the armature 41. The resulting control 10 without the feedback loop operational is substantially less accurate but would provide sufficient control during emergency conditions.

Figure 7:
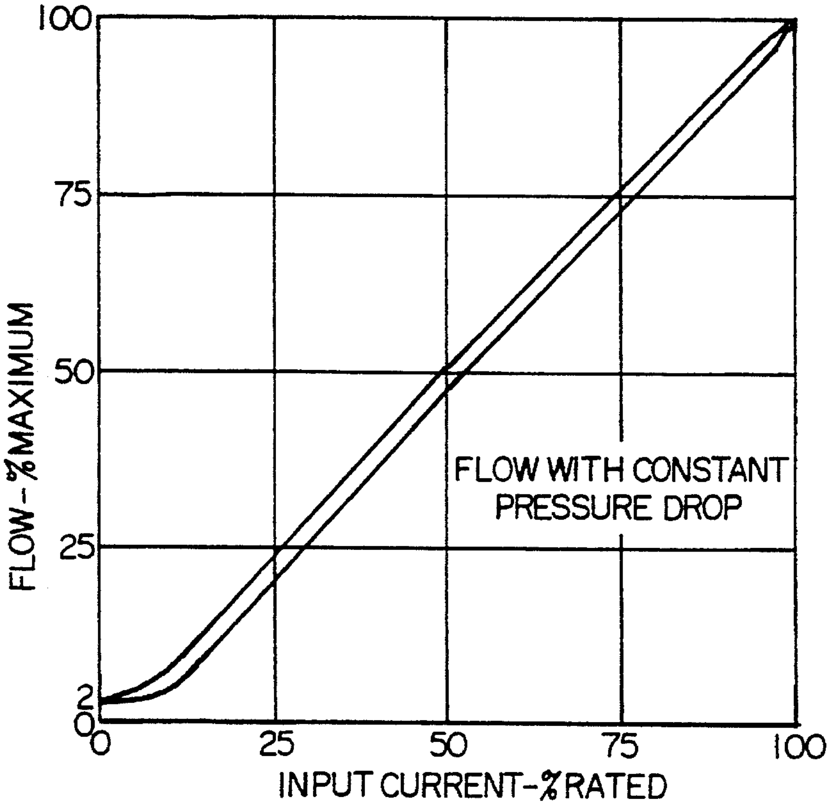
FIG. 7 is a graph illustrating flow-vs-input signal current with a fixed differential pressure across the valve and without position feedback.

FIG. 5 is an enlarged sectional view of another embodiment of the electro-hydraulic fluid metering and control device 10 of FIG. 1. As shown in FIG. 5, a single valve 114 is formed by nozzle 71 and flapper 73 and located within housing 77. Flapper 73 moves between nozzle 71 and stop plug 75 to control the metering area. With a constant differential pressure applied between the entrance to the nozzle 71 and the port 81 which connects to the cavity surrounding the flapper 73 the normalized flow characteristics of this single nozzle flapper valve is shown in FIG. 7. The hysteresis of the torque motor 11 is illustrated by the separation of the flow characteristics resulting from increasing and decreasing torque motor current.

With addition of the position sensor 13, signal conditioning circuit 69 and electronic control circuit 63 illustrated in FIG. 2, the flow response to demand signal 65 would exhibit substantially less hysteresis. The operational characteristics of the single nozzle flapper valve 114 are preferred for fuel metering.

Figure 8:
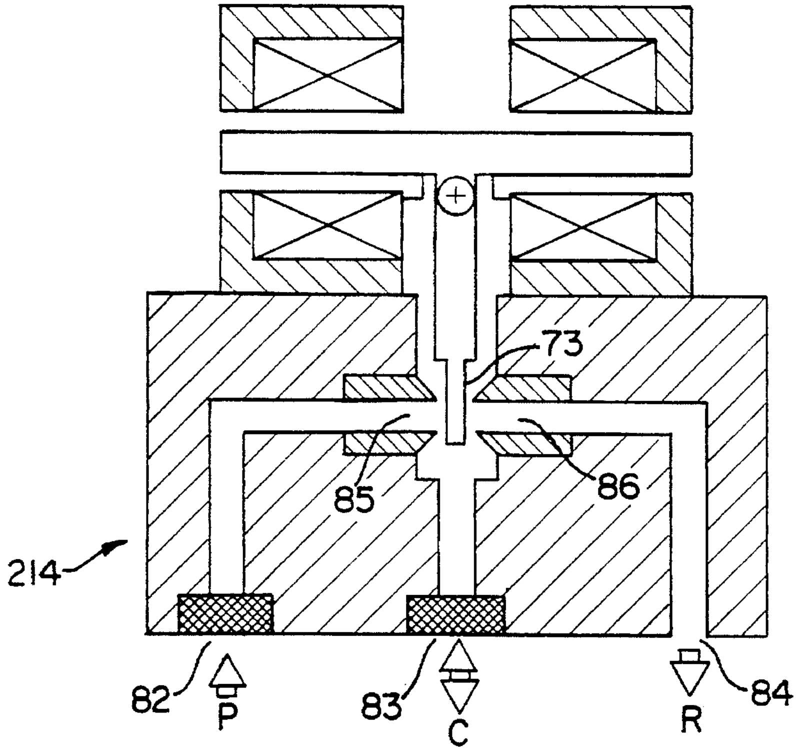
FIG. 8 is a schematic illustration of a two-nozzle version of the metering and control valve made according to the present invention.
Figure 9:
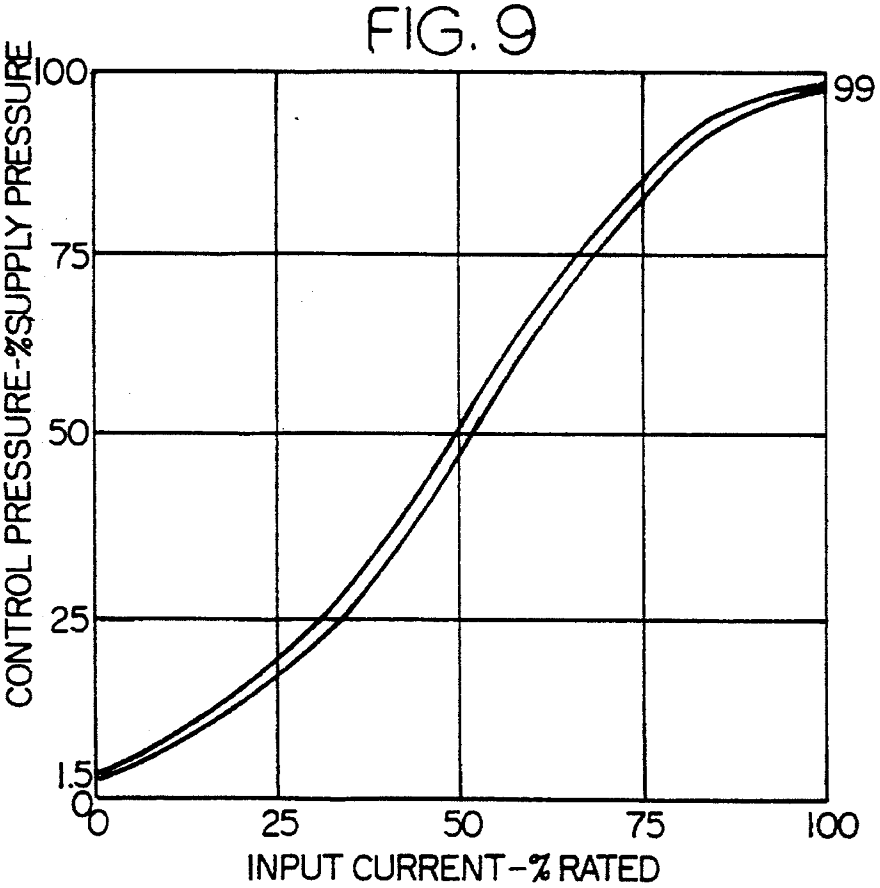
FIG. 9 is a graph illustrating control pressure-vs-input signal current with a fixed differential pressure across for the two-nozzle metering and control valve illustrated in FIG. 8.

FIG. 8 illustrates a double nozzle flapper valve 214 having preferred assignments for the supply pressure 82, return pressure 84 and control 83 ports. These assignments are typically used to control a differential area actuator with the control port connected to the actuator piston opposite the rod end. The generalized control pressure vs torque motor input current characteristics for flapper valve 214 is illustrated in FIG. 9. The hysteresis of the torque motor 11 is illustrated by the separation of the pressure characteristics resulting from increasing and decreasing torque motor current. With the addition of the position sensor 13 and the circuits illustrated in FIG. 2, the pressure response to demand signal 65 would exhibit substantially less hysteresis. The characteristics of the double nozzle flapper valve 214 are preferred for controlling differential area pistons.

While double nozzle flapper valves 214 are widely used to control differential area pistons, there are inherent contributions to instabilities as the flapper 73 moves away from the supply nozzle 85 and close to the return nozzle 86 because the pressure loading on the flapper 73 further moves the flapper toward the return nozzle 86. Without the benefits of position sensing and feedback the designer of the control system must use extremely high mechanical spring rates, low magnetic spring rates, small nozzle areas and damping fluid to overwhelm the pressure loading. With position sensing and electronic feedback, the designer of the control system is no longer similarly constrained.

In FIG. 5, the sensor coils are formed about a central cores which has an adjustable magnetic core screws 79 and 81 for calibrating the balance between the two sensor halves. Typically, the magnetic portion 39 of the armature only moves about 0.008 inches and the adjustable magnetic core screws 79 and 81 have extremely fine pitch threads. Jam nuts (not shown) are typically used to lock the calibration positions of the adjustable magnetic core screws 79 and 81.

Adjustment screws 94 and 95 and compression springs 92 and 93 are used to trim calibrate the armature 17 torque. The primary calibration is made by setting the torque motor air gaps 88, 89, 90 and 91 and machining the springs 19 and 21.

What is claimed is:

1. An electro-hydraulic fluid metering and control device having a sensor section, a torque motor section, and a valve section, the improvement comprising:

a valve body in said valve section having a plurality of ports and channels for the flow of fluid through said valve section in response to movement of a valve;

a torque motor in said torque motor section and mounted on said valve body to define a center line for said sensor section, a torque motor section, and a valve section, said torque motor having a pair of permanent magnets located in a plane of geometric symmetry around said center line, an armature having a first magnetic portion located between pole pieces of one of said pair of permanent magnets and a second magnetic portion located between pole pieces of the other of said pair of permanent magnets, a pair of torque motor coils positioned around said first and second magnetic portions, said armature having a first extension that extends into said sensor section and a second extension that extends into said valve section, said first extension being magnetic and said second extension being non-magnetic, spring means for supporting said armature to define a bending axis of pivoture along a plane perpendicular to the geometric symmetry of said pair of permanent magnets; said spring means positioning said second extension to with respect to said valve such that movement thereof meters fluid from an inlet port to an outlet port;

a position sensor located in said sensor section and having a pair of magnetic cores positioned in said plane of geometric symmetry around said center line with said first magnetic extension being equally located between said magnetic cores, said sensor having first and second excitation coils connected in series and located around said first and second magnetic cores, respectively and first and second signal coils located around said first and second magnetic cores;

actuation means responsive to a demand signal and connected to supply said torque motor coils and said first and second excitation coils with actuation signals; said torque motor coils on actuation causing first and second magnetic portions to moves with respect to said pole pieces of said pair of permanent magnets and pivot said armature in said plane of geometric symmetry to provide corresponding movement through said non-magnetic extension for moving said valve to meter fluid though said outlet port and for said magnetic extension to move toward and away from said magnetic coils to create separate and independent signals from said signal coils; and control means connected to said actuation means and responsive to said independent signals from said first and second signal coils for selectively modifying said actuation signals as a function of said independent signals to assure said actuation signal supplied to said torque motor moves said valve to meet said demand signal.

2. The electro-hydraulic fluid metering and control device as recited in claim 1 wherein said plane of geometric symmetry defined by the movement of said armature substantially cancels environmental effects including vibration, sustained acceleration and differential thermal expansions of materials with respect to metering and control accuracy of said valve.

3. The electro-hydraulic fluid metering and control device as recited in claim 2 further including include magnetic screws for moving and calibrating said first and second magnetic cores to a null position in said geometric symmetry plane.

4. The electro-hydraulic fluid metering and control device as recited in claim 3, wherein said spring means includes two spring beams to support said armature for pivotal movement and said spring beams are shaped to define the bending axis of pivoture which is perpendicular to a plane of geometric symmetry.

5. The electro-hydraulic fluid metering and control device as recited in 4, further including an elastomeric seal located in said plane of geometric symmetry and along said bending axis of pivotal movement for isolating said valve section from said torque motor section.

6. The electro-hydraulic fluid metering and control device as recited in claim 5 wherein control means adds said independent signals from said signal coils to form a sum signal and subtracting said independent signals to form a difference signal and divides said difference by said sum signal to form a linearized position signal for said valve to assure that the flow of fluid corresponds with the desired demand.

* * * * *